3,512,958
PREPARATION OF HIGH PURITY ARSENIC
Masumi Yokozawa, Takatsuki-shi, and Shigetoshi Takayanagi, Kyoto, Japan, assignors to Matsushita Electronics Corporation, Osaka, Japan, a corporation of Japan
Filed May 1, 1967, Ser. No. 635,218
Claims priority, application Japan, May 4, 1966, 41/28,661
Int. Cl. C22b 33/00
U.S. Cl. 75—84                    4 Claims

ABSTRACT OF THE DISCLOSURE

Elemental arsenic to be purified is melted with high purity elemental bismuth and the resulting alloy is distilled under vacuum. The arsenic vapors are condensed and the bismuth and impurities with residual arsenic remain in the still. Arsenic having a purity of 99.999+ is produced substantially free of electrically active impurities and especially suitable for preparation of semiconductors is recovered.

---

This invention relates to a process for preparing high purity arsenic, more particularly arsenic having a purity of at least 99.999%.

In the conventional methods for preparing high purity elemental arsenic, it has been extremely difficult to remove other elements which are usually present in crude arsenic materials, particularly chalcogen elements such as sulfur, selenium and tellurium. For example, there has been proposed a method in which elemental arsenic is purified by sublimation in vacuum or in a hydrogen atmosphere, but the vapor pressures of chalcogen contaminants are high and therefore the separation efficiencies thereof are poor, with the result that it has been impossible to improve the purity of arsenic to the desired high degree.

Further, there has also been proposed a process in which crude arsenic and high purity lead are comelted and arsenic is distilled from the melt. According to this process, chalcogen elements contained in the crude arsenic react with the lead to form lead chalcogenides, and therefore the removal of chalcogen elements can be effectively effected. In the other hand, however, the migration of some metallic lead into the distilled and purified elemental arsenic is unavoidable. Moreover, lead is an electrically active impurity which becomes a donor in arsenides of aluminum, gallium and indium and becomes an acceptor in arsenides of zinc and cadmium, so that the presence of even a slight amount of lead greatly affects the properties of the semiconductors. In order to secure arsenic substantially freed of such traces of lead, the arsenic must be subjected to repeated purification by sublimation or other procedures which not only require much labor and time but the overall yield is quite low.

It is an object of this invention to produce elemental arsenic substantially free of chalcogen elements such as sulfur, selenium and tellurium. It is also the object of this invention to produce arsenic having a purity of more than 99.999%, economically and efficiently.

It is a further object of this invention to purify crude arsenic by distillation without the use of lead as an alloying constituent.

Figure 1:
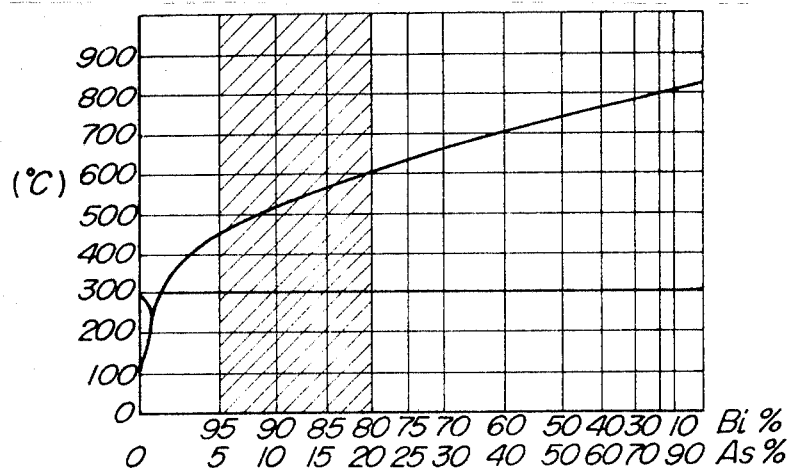
Figure 2:
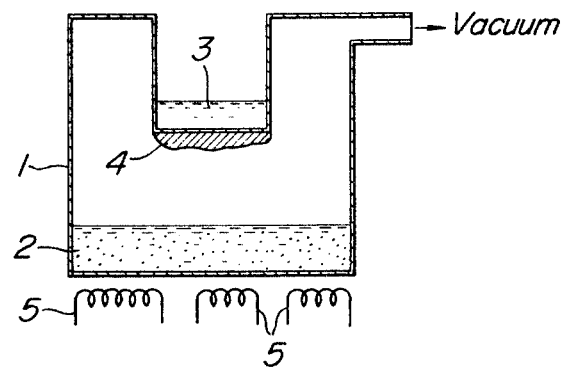

These and other objects will be apparent from the following description taken with the accompanying drawings in which FIG. 1 is the melting point curve of bismuth-arsenic alloys employed in the practice of the invention and FIG. 2 is a more-or-less diagrammatic sectional view of a still for purification and recovery of elemental arsenic from bismuth-arsenic alloys in accordance with the invention.

The present invention provides a process in which, as an eutectic alloy material for the distillation of arsenic, a bismuth-arsenic alloy is used to retain the injurious impurities as well as to obtain higher purity elemental arsenic. For the same arsenic content (by weight), bismuth-arsenic alloys have lower melting points than lead-arsenic alloys. Stated another way, for a given distilling temperature, a bismuth-arsenic alloy will have a substantially greater arsenic content than the lead-bismuth alloy. The partial pressure of bismuth vapor in equilibrium with a bismuth-arsenic alloy melt is about two figures lower than the partial pressure of lead vapor in a lead-arsenic alloy melt, and consequently the amount of bismuth which is condensed with the arsenic obtained by the fractional distillation of bismuth-arsenic alloy is far smaller than the amount of lead which condenses with the arsenic obtained by the fractional distillation of lead-arsenic alloy. Moreover, bismuth is substantially electrically neutral in arsenides of aluminum, gallium and indium. Therefore, even if a slight amount of bismuth is carried with the arsenic into said semiconductors, the characteristics of the semiconductors are scarcely affected. This also is another advantage derived from the use of bismuth.

The present process for preparing high purity arsenic will be described with reference to the accompanying drawings. A bismuth-arsenic alloy having a composition within the shaded area in FIG. 1, i.e., containing 5–20% by weight of arsenic is charged to a quartz or telex-glass tube, not shown, having the interior coated with carbon, and the tube is vacuum sealed. The sealed tube is then heated at 400–600° C. for 2 hours or more to insure homogeneity of the bismuth-arsenic alloy and reaction of the bismuth with impurities. After cooling the tube to room temperature, the alloy is taken out and is transferred into the still 1 shown in FIG. 2. Preferably, the still is heated electrically by units 5 for ease of control, but other means may be used if desired. The alloy 2 is heated to its melting point, while keeping the interior of the still 1 under vacuum, thereby distilling the arsenic under reduced pressure and the elemental arsenic 4 is condensed in the cooling zone 3 of the still. To prevent possible contamination and/or oxidation, the still may be flushed with an inert gas after charging with the alloy. The degree of vacuum may be substantially the same as in the distillation of lead-arsenic alloys but, preferably, the distillation is carried out at a pressure in the order of $10^{-4}$ mm. Hg.

In this operation, the arsenic content of the alloy is limited to 5–20% by weight, because where the arsenic content initially exceeds 20%, the melting point of the alloy becomes higher with a greater partial pressure of bismuth and consequent decrease in the purification efficiency. If the arsenic content is less than 5%, the yield of purified arsenic per run is excessively low thus increasing costs and lowering efficiency, particularly from an industrial standpoint. Moreover, if the preliminary melting of the bismuth-arsenic alloy requires a temperature higher than 600° C., the vapor pressure of arsenic in the tube becomes more than 1 atm. with substantial danger of explosion of the tube, while in case the heating temperature is lower than 400° C., an alloy melt is not formed and there is scarcely any reaction of bismuth with chalcogen impurities in the arsenic.

The purity of the arsenic obtained according to the present process as mentioned above is usually above the limits which can be effectively determined by conventional quantitative chemical analyses, as well as by the more sensitive procedures including mass spectroanalysis. Further, the detection and estimation of nonmetals such as sulfur, selenium and tellurium are difficult, though this is not the case with heavy metals such as bismuth, lead, copper and silver.

On the other hand, as a proper measure of the purity of a high purity arsenic employed in compound semiconductor materials, there may be adopted the electrical properties of a crystal fragment of a compound semicompound such as aluminum arsenide, gallium arsenide or indium arsenide synthesized by reacting under definite conditions said arsenic with aluminum, gallium or indium having a known purity. For example, a carrier concentration obtained by measuring the Hall coefficient of a crystal fragment of indium arsenide prepared by evaporating arsenic at 510° C. and reacting the arsenic vapor with 99.9999% purity metallic indium heated to 960° C., may be used as a scale for measuring the purity of the arsenic produced by the present invention.

The following examples are presented by way of illustration and the invention is not intended to be limited thereby.

EXAMPLE 1

10 g. of commercial arsenic having a purity of 99% and 40 g. of high purity bismuth having a purity of 99.9999% were charged into a quartz tube having an inner surface coated with carbon. The tube was evacuated to a vacuum of $10^{-4}$ mm. Hg and was sealed. The sealed tube was heated to 600° C. to melt the constituents and to form the desired bismuth-arsenic alloy, and this state was maintained for 5 hours to insure complete homogeneity of the alloy and reaction of the bismuth with the impurities. Subsequently, the sealed tube was cooled to room temperature. Thereafter the bismuth-arsenic alloy was taken out, was transferred to a still and was distilled in vacuum ($10^{-4}$ mm. Hg) at 600° C., and the vapors of arsenic were condensed in a cooling zone. After 3 hours of distillation under these conditions the yield of purified arsenic was more than 85%.

According to spectroscopic analysis, the purity of the thus purified arsenic was more than 99.9999%, excluding nonmetals shown below.

Impurities, and amounts thereof, contained in arsenics obtained by the present process and conventional process.

| | Bismuth (p.p.m.) | Lead (p.p.m.) | Silicon (p.p.m.) | Copper (p.p.m.) |
|---|---|---|---|---|
| Present process | 2-3 | | 1-2 | <1 |
| Conventional process | | 7-8 | 1-2 | <1 |

Further, the carrier concentration ($n$) of an indium arsenide obtained by reacting said purified arsenic with high purity indium (99.9999%) was $$n = 3-5 \times 10^{16} \text{ cm.}^{-3}$$

In contrast, the carrier concentration ($n'$) of an indium arsenide obtained by reacting the high purity indium with arsenic prepared by purifying the aforesaid commercial arsenic having a purity of 99% according to conventional process, i.e., according to distillation of lead-arsenic alloy, was $$n' = 5-12 \times 10^{16} \text{ cm.}^{-3}$$

As is clear from the above, it is understood that the indium arsenide obtained by use of arsenic purified according to the present process is markedly excellent as compared with the indium arsenide obtained by use of arsenide purified according to the conventional process.

EXAMPLE 2

5 g. of commercial arsenic having a purity of 99% and 45 g. of high purity bismuth having a purity of 99.9999% were charged into a quartz tube having an inner surface coated with carbon. The tube was evacuated to a vacuum of $10^{-4}$ mm. Hg and was sealed. The sealed tube was heated to 520° C. to melt the charge and form the bismuth-arsenic alloy, and this state was maintained for 10 hours. Thereafter the tube was cooled to room temperature, and the bismuth-arsenic alloy was taken out, was transferred into a still and was distilled in vacuum ($10^{-4}$ mm. Hg) at 520° C. to obtain elemental arsenic. The yield of arsenic according to the above process was more than 70%. The purity of the thus purified arsenic was the same as in Example 1.

As mentioned above, the present process for preparing high purity arsenic uses a bismuth-arsenic alloy as an eutectic alloy material for arsenic distillation to prevent the migration of injurious impurties as wel las to obtain arsenic higher in purity. Thus, the present invention greatly contributes to the industry.

It will be understood, of course, that the foregoing disclosure relates only to preferred embodiments of the invention and that it is intended to cover all changes and modifications of the examples of the invention herein chosen for the purposes of the disclosure which do not constitute departures from the spirit and scope of the invention.

What is claimed is:

1. A process for preparing high purity arsenic comprising mixing crude arsenic to be purified with high purity bismuth, heating the mixture to a temperature of 400–600 C., to melt the same and to form a bismuth-arsenic alloy; holding the alloy in molten condition at a temperature in the range 400–600° C., under vacuum to separate arsenic as vapors and condensing the arsenic vapors, said crude arsenic having a purity of about 99% and said high purity bismuth having a purity of about 99.9999%.

2. A process as set forth in claim 1 wherein the bismuth-arsenic alloy contains from 5–20% arsenic.

3. A process as set forth in claim 1 wherein the condensed arsenic has a purity of more than 99.9999%.

4. A process as set forth in claim 1 wherein the initial mixture is composed of 10 parts arsenic and 40 parts bismuth.

References Cited

UNITED STATES PATENTS

| 577,802 | 2/1897 | Westman | 75—84 X |
| 1,433,533 | 10/1922 | Cullen | 75—84 |
| 2,342,733 | 2/1944 | Guyard | 75—70 |
| 2,944,885 | 7/1960 | Wolff | 75—84 X |
| 2,975,048 | 3/1961 | Antell et al. | 75—84 |
| 3,047,366 | 7/1962 | Williams | 23—209 X |
| 3,218,159 | 11/1965 | Champ | 75—70 X |
| 3,359,071 | 12/1967 | Merkel | 23—209 |

CARL D. QUARFORTH, Primary Examiner

B. H. HUNT, Assistant Examiner

U.S. Cl. X.R.

23—209; 75—63, 70